J. KNOX.
Thill-Coupling.

No. 68,515.  Patented Sept. 3, 1867.

Witnesses:
Theo Tuscke
Wm Trewin

Inventor:
John Knox
Per Munn & Co
Attorneys

United States Patent Office.

JOHN KNOX, OF MOUNT GILEAD, OHIO.

Letters Patent No. 68,515, dated September 3, 1867.

---

IMPROVEMENT IN THILL-COUPLING.

---

The Schedule referred to in these Letters Patent and making part of the same.

---

TO ALL WHOM IT MAY CONCERN:

Be it known that I, JOHN KNOX, of Mount Gilead, in the county of Morrow, and State of Ohio, have invented a new and useful Improvement in Thill-Coupling; and I do hereby declare that the following is a full, clear, and exact description thereof, which will enable those skilled in the art to make and use the same, reference being had to the accompanying drawings, forming part of this specification, in which—

Figure 1:
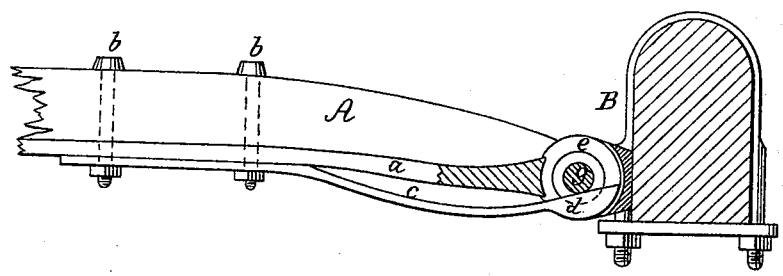

Figure 1 is a side view of my improved coupling partly in section, showing the coupling-pin held by a spring instead of a screw and nut.

Figure 2:
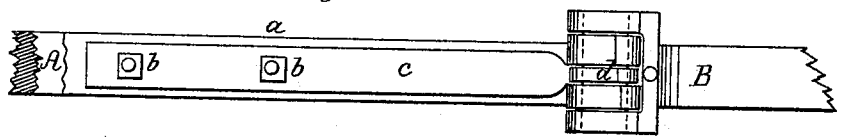

Figure 2, a top view.

Figure 3:

Figure 3, a detached view of the coupling-pin.

Figure 4:
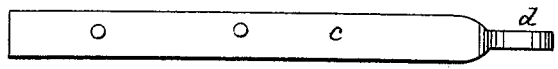

Figure 4, a detached view of the coupling-spring.

Similar letters of reference indicate corresponding parts.

This invention relates to an improvement in the construction of a coupling for the shafts of buggies, wagons, and other light vehicles, and consists in employing a coupling-pin with a ring groove or recess around the middle, in which is fitted the end of a spring secured to the shaft and let through the eye to hold it in place, instead of a screw and nut in the ordinary way of fastening the coupling-pin. This device has the advantage of great convenience in readily attaching and detaching the shaft from the wagon, together with the security and safety of the fastening.

A represents a shaft, upon which is fastened a plate, $a$, secured by the screw-bolts $b\ b$, which also secure to the plate $a$ a long spring, $c$, which has a flat-sided curved end, $d$, fitted in a cross-slot made in the bolt-eye $e$, on the end of the plate $a$, for the purpose of securing the coupling-pin or bolt $g$ to the clip-plate B. The coupling-pin $g$ has a ring recess or groove, $s$, around the middle, which receives the end $d$ of the spring $c$ and holds it fast in the eye of the plate $a$, when connected with the clip B, as shown in fig. 1. The spring $c$ is held in place by the screw-bolts $b\ b$, and is easily released, to allow the pin to be introduced or removed, by unscrewing one of the bolts or raising the end of the spring with the point of a knife, thus coupling and uncoupling a shaft with great facility and expedition.

Claim.

Having thus described my invention, what I claim as new, and desire to secure by Letters Patent, is—

The spring $c$, combined with the slotted eye-bolt $e$ and grooved coupling-pin $g$, arranged and operating substantially as described.

JOHN KNOX.

Witnesses:
    WM. D. HAMMELL,
    A. B. McGIVEN.